(12) United States Patent
Wang

(10) Patent No.: US 9,348,170 B2
(45) Date of Patent: May 24, 2016

(54) COLOR FILTER SUBSTRATE AND DISPLAY DEVICE

(71) Applicants: BOE Technology Group Co., Ltd., Beijing (CN); Beijing BOE Optoelectronics Technology Co., Ltd., Beijing (CN)

(72) Inventor: Liang Wang, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 29 days.

(21) Appl. No.: 14/571,895

(22) Filed: Dec. 16, 2014

(65) Prior Publication Data

US 2016/0103360 A1    Apr. 14, 2016

(30) Foreign Application Priority Data

Oct. 11, 2014   (CN) .......................... 2014 1 0535078

(51) Int. Cl.

| | |
|---|---|
| *G02F 1/1335* | (2006.01) |
| *G02F 1/1333* | (2006.01) |
| *G02F 1/1343* | (2006.01) |
| *G06F 3/041* | (2006.01) |
| *G06F 1/16* | (2006.01) |

(52) U.S. Cl.

CPC ...... *G02F 1/133514* (2013.01); *G02F 1/13338* (2013.01); *G02F 1/13439* (2013.01); *G02F 1/133345* (2013.01); *G02F 1/133512* (2013.01); *G06F 1/16* (2013.01); *G06F 3/0412* (2013.01)

(58) Field of Classification Search

CPC .................. G02F 1/13338; G02F 2001/13312; G02F 1/133514; G02F 1/133512; G02F 1/133516; G02F 1/1333; G02F 1/133305; G02F 1/133351; G06F 3/0412; G06F 3/045; G06F 3/044

USPC ........................................... 349/12, 128, 106

See application file for complete search history.

(56) References Cited

U.S. PATENT DOCUMENTS

| | | | |
|---|---|---|---|
| 9,170,692 B2 * | 10/2015 | Yang ................. G02F 1/134336 | |
| 2010/0194710 A1 * | 8/2010 | Koito ...................... G06F 3/047 | 345/174 |
| 2016/0018922 A1 * | 1/2016 | Wang .................... G06F 3/0412 | 345/174 |

* cited by examiner

*Primary Examiner* — Mike Qi

(74) *Attorney, Agent, or Firm* — Banner & Witcoff, Ltd.

(57) ABSTRACT

A color filter substrate and a display device are provided, and the color filter substrate comprises a base substrate; a color filter layer, disposed on the base substrate and comprising a plurality of sub-pixels; and a touch electrode, disposed on a side of the color filter layer away from the base substrate. A plurality of first concave portions are disposed in the color filter layer on the side away from the base substrate, and the touch electrode covers surfaces of the plurality of the first concave portions.

20 Claims, 4 Drawing Sheets

COLOR FILTER SUBSTRATE AND DISPLAY DEVICE

This application claims priority to Chinese Patent Application No. 201410535078.3, filed on Oct. 11, 2014. The present application claims priority to and the benefit of the above-identified application and is incorporated herein in its entirety.

TECHNICAL FIELD

At least one embodiment of the present disclosure relates to a color filter substrate and a display device.

BACKGROUND

At present, touch technologies are widely used in intelligent devices to achieve human-computer interaction. Touch screens may comprise on-cell touch screens and in-cell touch screens. In the on-cell touch screen, for example, a touch panel is disposed between a color filter substrate and a corresponding polarizing plate of a liquid crystal panel, and thereby a touch sensor is disposed on the liquid crystal panel. The on-cell touch screen is thick and heavy and thus it is difficult to meet the growing demands for thin and light display products. In the in-cell touch screen, the touch sensor is disposed inside the liquid crystal panel and a cover glass is attached to the liquid crystal panel, and the in-cell touch screen has the advantages of high transmittance, high lamination rate, light weight, small thickness and so on. The in-cell touch screen generally comprises a color filter substrate and an array substrate. The color filter substrate generally comprises a glass substrate, a black matrix, a color filter layer, an overcoat layer and a touch electrode.

SUMMARY

At least one embodiment of the present disclosure provides a color filter substrate. The color filter substrate comprises a base substrate; a color filter layer, disposed on the base substrate and comprising a plurality of sub-pixels; and a touch electrode, disposed on a side of the color filter layer away from the base substrate. A plurality of first concave portions are disposed in the color filter layer on the side away from the base substrate, and the touch electrode covers surfaces of the plurality of the first concave portions.

At least one embodiment of the present disclosure further provides a display device. The display device comprises the above-mentioned color filter substrate.

BRIEF DESCRIPTION OF THE DRAWINGS

In order to clearly illustrate the technical solution of the embodiments of the present disclosure, the drawings of the embodiments will be briefly described in the following; it is obvious that the described drawings are only related to some embodiments of the present disclosure and thus are not limitative of the present disclosure.

DETAILED DESCRIPTION

In order to make objects, technical details and advantages of the embodiments of the present disclosure apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "comprise," "comprising," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may comprise an electrical connection, directly or indirectly. "On," "under," "right," "left" and the like are only used to indicate relative position relationship, and when the position of the object which is described is changed, the relative position relationship may be changed accordingly.

Figure 1:
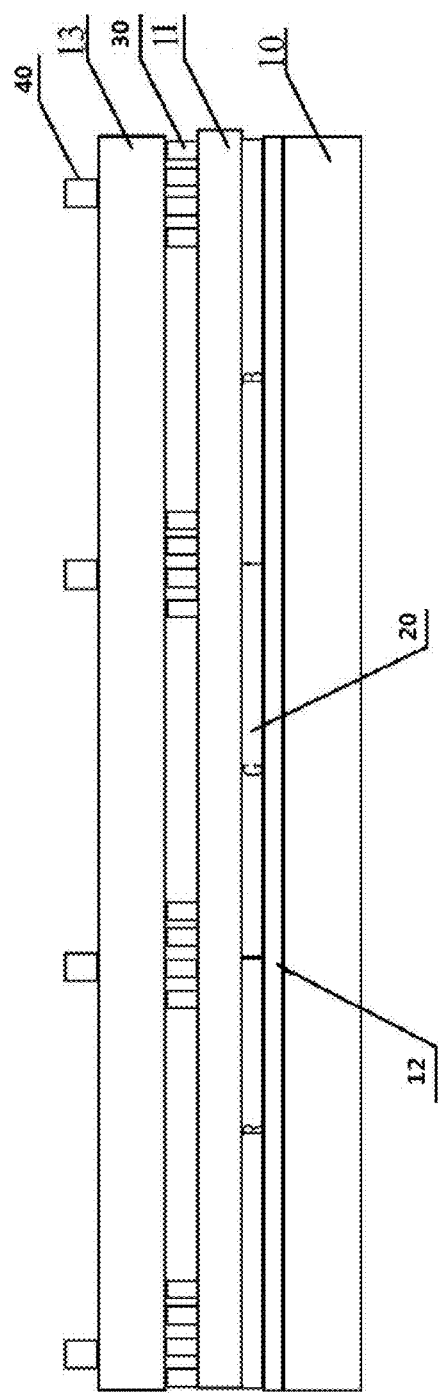
FIG. 1 is a schematic view illustrating a structure of a color filter substrate.

FIG. 1 is a schematic view illustrating a structure of a color filter substrate. As illustrated in FIG. 1, the color filter substrate comprises a base substrate 10, and a second insulating layer 12 and a color filter layer 20 that are sequentially disposed on the base substrate 10. For example, the second insulating layer 12 comprises a black matrix for blocking light. For example, the color filter layer 20 comprises red sub-pixels, green sub-pixels and blue sub-pixels, and the black matrix is disposed between adjacent sub-pixels. A first insulating layer 11 is disposed on the color filter layer 20 and configured to eliminate the unevenness caused by the height difference between the color filter layer 20 and the black matrix. A touch electrode 30 is disposed on the first insulating layer 11, the touch electrode 30 may be a touch sensing electrode or a touch driving electrode, and the touch electrode 30 for example is made of a transparent conducting material. A third insulating layer 13 is disposed on the touch electrode 3 and configured to planarize the surface of the color filter substrate. According to the practical requirements, spacers 40 may be further disposed on the third insulating layer 13 and configured to keep the cell gap between the color filter substrate and an array substrate after the color filter substrate and the array substrate are assembled with each other.

The inventor of the present disclosure noted that, because both the touch driving electrode and the touch sensing electrode of the in-cell touch screen are integrated inside the array substrate or the color filter substrate, the signal-noise ratio SNR for touch is reduced and thus the touch accuracy and the touch sensitivity are reduced.

At least one embodiment of the present disclosure provides a color filter substrate, which comprises a base substrate, a color filter layer and a touch electrode. The color filter layer is disposed on the base substrate and comprises a plurality of sub-pixels; and the touch electrode is disposed on a side of the color filter layer away from the base substrate. A plurality of first concave portions are disposed in the color filter layer on the side away from the base substrate, and the touch electrode covers surfaces of the plurality of the first concave portions. In the color filter substrate provided by embodiments of the present disclosure, the plurality of first concave portions are disposed in the color filter layer, and then the touch electrode is configured to cover surfaces of the plurality of the first concave portions, so that the surface area of the touch electrode is increased, which is helpful for accumulating more charges. Thus, the touch sensitivity and the touch accuracy are increased greatly.

Referring to the drawings, the color filter substrate and the display device provided by embodiments of the present disclosure will be described in detail in the following.

Figure 2:
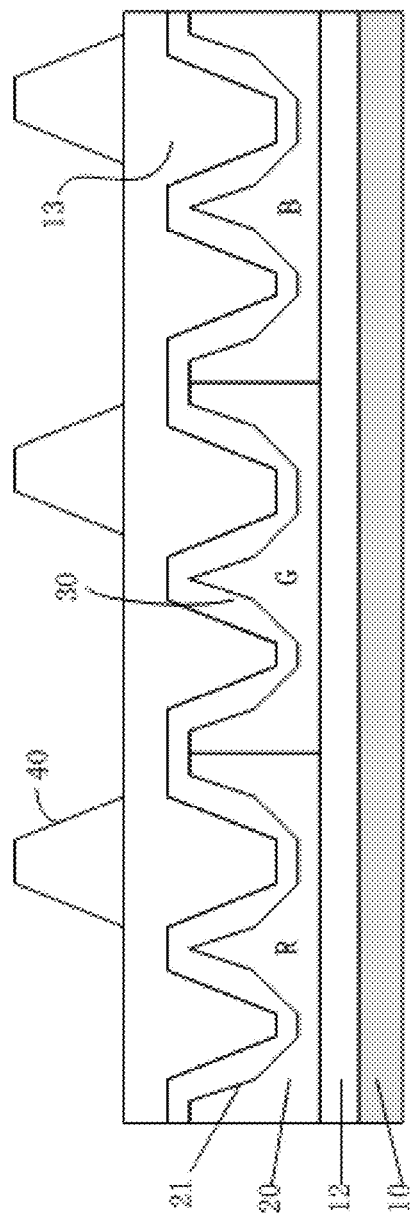
FIG. 2 is a schematic view illustrating a structure of a color filter substrate provided by an embodiment of the present disclosure.

As illustrated in FIG. 2, the color filter substrate provided by at least one embodiment of the present disclosure comprises : a base substrate 10, and a color filter layer 20 and a touch electrode 30 that are sequentially disposed on the base substrate 10; the color filter layer 20 comprises a plurality of sub-pixels, and a plurality of first concave portions 21 are disposed in the color filter layer 20 on a side away from the base substrate 10; and the touch electrode 30 is disposed on the side of the color filter layer 20 away from the base substrate 10, and the touch electrode 30 covers the surfaces of the plurality of the first concave portions 21.

Figure 3:
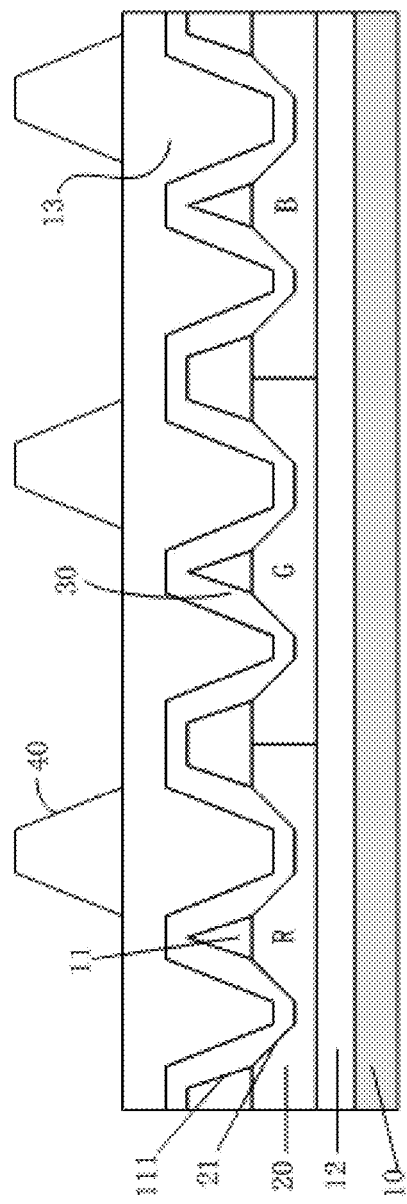
FIG. 3 is a schematic view illustrating a structure of another color filter substrate provided by an embodiment of the present disclosure.

As illustrated in FIG. 3, the color filter substrate provided by another embodiment of the present disclosure further comprise a first insulating layer 11 disposed on the side of the color filter layer 20 away from the base substrate 10, and a plurality of openings 111 corresponding to the plurality of the first concave portions 21 in the color filter layer 20 are disposed in the first insulating layer 11; each opening 111 and its corresponding first concave portion 21 are communicated, and the touch electrode 30 is formed on the first insulating layer 11 and further covers the surfaces of the plurality of the openings 111. In the embodiment of the present disclosure, the first insulating layer is formed on the color filter layer formed with the first concave portions, the openings corresponding to the first concave portions are formed in the first insulating layer, and the touch electrode is configured to cover the surfaces of the first concave portions and the surfaces of the openings simultaneously so that the surface area of the touch electrode is increased further. Thus, the touch sensitivity and the touch accuracy are increased further.

In the above-mentioned embodiments, the color filter substrate may further comprise a second insulating layer 12 disposed on a side of the color filter layer 20 facing the base substrate 10, as illustrated in FIG. 2 and FIG. 3. Namely, the second insulating layer 12 is disposed between the color filter layer 20 and the base substrate 10.

It is to be noted that, in the color filter substrate provided by embodiments of the present disclosure, the depth of the first concave portion is smaller than or equal to the thickness of the color filter layer. For example, as illustrated in FIG. 2 and FIG. 3, the depth of the first concave portion 21 is smaller than the thickness of the color filter layer 20, and in this case, the touch electrode 30 does not contact the base substrate 10 or the second insulating layer 12 (if it is provided). For example, as illustrated in FIG. 4, the depth of the first concave portion 21 is equal to the thickness of the color filter layer 20, and in this case, the touch electrode 30 contacts the base substrate 10 or the second insulating layer 12 (if it is provided).

Figure 4:
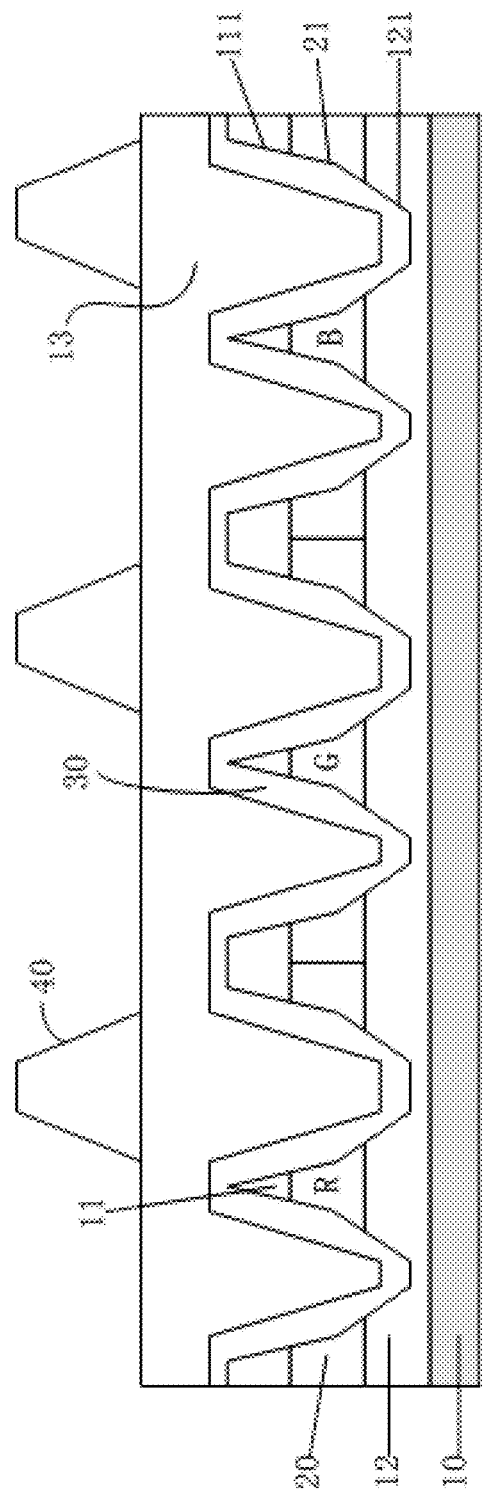
FIG. 4 is a schematic view illustrating a structure of a further color filter substrate provided by an embodiment of the present disclosure.

Besides, in order to further increase the surface area of the touch electrode, as illustrated in FIG. 4, when the depth of the first concave portion 21 is equal to the thickness of the color filter layer 20, a plurality of second concave portions 121 corresponding to the plurality of the first concave portions 21 in the color filter layer 20 are disposed in the second insulating layer 12, each second concave portion 121 and its corresponding first concave portion 21 are communicated, and the touch electrode 30 further covers the surfaces of the plurality of the second concave portions 121. In this embodiment, the first concave portions are provided in the color filter layer, the openings are provided in the first insulating layer that is disposed on the upper side of the color filter layer and contacts the color filter layer, and the second concave portions are provided in the second insulating layer that is disposed on the lower side of the color filter layer and contacts the color filter layer. Thus, the surface area of the touch electrode is increased, and thus the touch sensitivity and the touch accuracy are increased greatly.

For example, the second insulating layer 12 comprises a black matrix, and the black matrix is made of an opaque resin material so as to block light. With respect to the example that the second insulating layer 12 comprises the black matrix, descriptions thereof are provided in the following.

Figure 5:
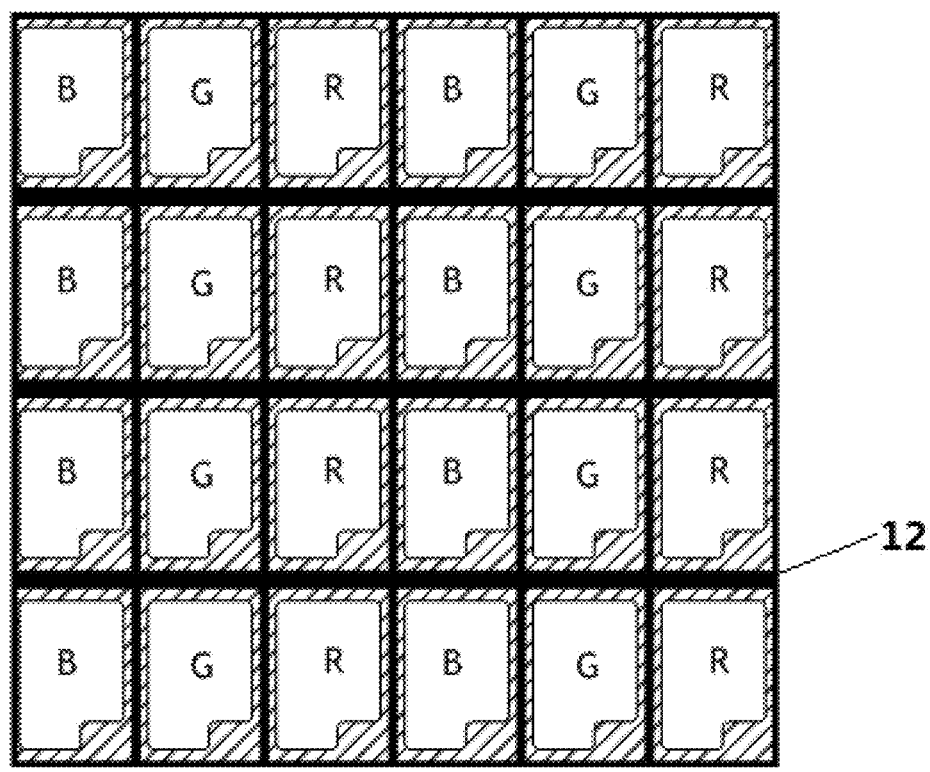
FIG. 5 is a top view illustrating sub-pixels in a color filter layer of a color filter substrate provided by an embodiment of the present disclosure.

As illustrated in FIG. 5, in embodiments of the present disclosure, the color filter layer 20 comprises a plurality of sub-pixels, for example, red sub-pixels, green sub-pixels and blue sub-pixels. These sub-pixels are separated by the black matrix 12 and are provided in the opening regions of the black matrix 12, so as to avoid the light leakage and the crosstalk. For example, the color filter layer 20 comprises sub-pixels in other color, for example black sub-pixels, yellow sub-pixels, and so on.

In embodiments of the present disclosure, the touch electrode 30 may be made of a transparent conducting material, for example, tin indium oxide (ITO), indium zinc oxide (IZO), carbon nano-tube, nano-silver and so on, and the touch electrode 30, for example, is formed as an electrode wire extending along the horizontal or the longitudinal direction. When the touch electrode 30 passes through the concave portion, it covers a portion of or the whole of the surface of the concave portion. In the case that the touch electrode 30 is made of the transparent conducting material, when the depth of the first concave portion 21 is smaller than the thickness of the color filter layer 20, the touch electrode 30 is disposed in regions where the sub-pixels are located (namely, the touch electrode 30 passes through the opening regions of the black matrix) and/or in regions between sub-pixels (namely, the touch electrode 30 are provided in the region where the black matrix is located); and when the depth of the first concave portion 21 is equal to the thickness of the color filter layer 20, the first concave portion 21 is disposed in the region where the black matrix is located, so as to avoid the case that the color filter layer 20 cannot filter light at positions corresponding to the first concave portions 21.

The cost of the nano-silver material is relatively high, the resistance of the transparent metal oxide material such as ITO is relatively large, and the surface area of the touch electrode is increased by the design of the first concave portions 21 and the openings 111 in the color filter substrate provided by embodiments of the present disclosure. Therefore, in order to decrease the resistance of the touch electrode, the touch electrode 30 in an embodiment is made of a metal, for example, aluminum, chromium, copper or silver-palladium-copper alloy (APC). Because the metal generally is opaque, in order not to affect the transmittance of the color filter substrate, the touch electrode 30 is disposed in the region where the black matrix is located. In this case, the depth of the first concave portion 21 may be smaller than or equal to the thickness of the color filter layer 20.

Therefore, in at least one embodiment, when the depth of the first concave portion is smaller than the thickness of the color filter layer, the first concave portion is disposed in the region where the sub-pixels are located, and/or the first concave portion is disposed in the region where the black matrix is located; and when the depth of the first concave portion is equal to the thickness of the color filter layer, the first concave portion is disposed in the region where the black matrix is located. In at least one embodiment, when the first concave portion is disposed in the region where sub-pixels are located, the touch electrode is made of the transparent conducting material; and when the first concave portion is disposed in the region where the black matrix is located, the touch electrode is made of the transparent conducting material or the opaque metal material.

It is to be noted that, the color filter substrate provided by embodiments of the present disclosure is not limited to the above-mentioned examples. For example, it is possible that the color filter substrate does not comprise the first insulating layer, the first concave portions and the second concave portions are respectively formed in the color filter layer and the second insulating layer, and the touch electrode covers the surfaces of the first concave portions and the second concave portions. For example, it is possible that the third insulating layer is disposed on the touch electrode, and spacers are formed on the third insulating layer.

It is to be noted that, in the above-mentioned embodiments, the depth of the second concave portion 121 is smaller than or equal to the thickness of the second insulating layer 12. For example, when the depth of the second concave portion 121 is equal to the thickness of the second insulating layer 12, the touch electrode 30 is made of the opaque metal material. In this case, the opaque metal material may be further used as the black matrix at positions corresponding to the second concave portions.

In the above-mentioned embodiments of the present disclosure, the first insulating layer 11 may be an inorganic insulating layer, and for example, the first insulating layer 11 is formed of silicon nitride, silicon oxide, silicon oxynitride and the like. On one hand, the first insulating layer 11 eliminates the unevenness caused by the height difference between the color filter layer 20 and the black matrix; on the other hand, the first insulating layer 11 insulates the touch electrode 30 from other metals to prevent broken-circuit or short-circuit of the touch electrode 30.

The touch electrode 30 may be a touch sensing electrode or a touch driving electrode. In order to increase the touch sensitivity, the touch electrode 30 disposed on the color filter substrate generally is the touch sensing electrode.

In an embodiment, as illustrated in FIG. 4 and FIG. 5, the above-mentioned color filter substrate may further comprise a third insulating layer 13, and the third insulating layer 13 covers the touch electrode 30. The third insulating layer 13 may be an inorganic insulating layer, for example, the third insulating layer 13 is formed of silicon nitride, silicon oxide, silicon oxynitride and the like. On one hand, the third insulating layer 13 planarizes the surface of the color filter substrate; on the other hand, the third insulating layer 13 insulates the touch electrode 30 from other material to further prevent broken-circuit or short-circuit of the touch electrode 30.

In an embodiment, the above-mentioned color filter substrate further comprises a spacer 40, and the spacer 40 is disposed on a side of the third insulating layer 13 away from the base substrate 10, to keep the cell gap between the color filter substrate and the array substrate of the touch screen. The spacer 40 may be a cylindrical spacer, and formed on the color filter substrate through a photolithography method, for example.

At least one embodiment of the present disclosure further provides a display device, which comprises the above-mentioned color filter substrate. The display device may be any product or component that has a display function, such as a liquid crystal panel, a mobile phone, a tablet computer, a television, a display screen, a laptop computer, a digital frame, and a navigator.

In the color filter substrate and the display device provided by embodiments of the present disclosure, the first concave portions are provided in the color filter layer, the openings are provided in the first insulating layer that is disposed on the upper side of the color filter layer and contacts the color filter layer, and the second concave portions are provided in the second insulating layer that is disposed on the lower side of the color filter layer and contacts the color filter layer. Thus, the surface area of the touch electrode is increased so that more charges are accumulated, and thus the touch sensitivity and the touch accuracy are increased greatly.

The foregoing embodiments merely are exemplary embodiments of the disclosure, and not intended to define the scope of the disclosure, and the scope of the disclosure is determined by the appended claims.

The invention claimed is:

1. A color filter substrate, comprising:
a base substrate;
a color filter layer, disposed on the base substrate and comprising a plurality of sub-pixels; and
a touch electrode, disposed on a side of the color filter layer away from the base substrate,
wherein a plurality of first concave portions are disposed in the color filter layer on the side away from the base substrate, and the touch electrode covers surfaces of the plurality of the first concave portions.

2. The color filter substrate according to claim 1, further comprising:
a first insulating layer, disposed on the side of the color filter layer away from the base substrate, wherein
a plurality of openings corresponding to the plurality of the first concave portions in the color filter layer are disposed in the first insulating layer, each opening and its corresponding first concave portion are communicated, and the touch electrode is formed on the first insulating layer and further covers surfaces of the plurality of the openings.

3. The color filter substrate according to claim 2, further comprising:
a second insulating layer, disposed on a side of the color filter layer facing the base substrate.

4. The color filter substrate according to claim 3, wherein a depth of the first concave portion is smaller than or equal to a thickness of the color filter layer.

5. The color filter substrate according to claim 4, wherein the second insulating layer comprises a black matrix;
when the depth of the first concave portion is smaller than the thickness of the color filter layer, the first concave portion is disposed in a region where the sub-pixels are located, and/or the first concave portion is disposed in a region where the black matrix is located; and when the depth of the first concave portion is equal to the thickness of the color filter layer, the first concave portion is disposed in the region where the black matrix is located.

6. The color filter substrate according to claim 5, wherein
when the first concave portion is disposed in the region where the sub-pixels are located, the touch electrode is made of a transparent conducting material; and
when the first concave portion is disposed in the region where the black matrix is located, the touch electrode is made of the transparent conducting material or an opaque metal material.

7. The color filter substrate according to claim 4, wherein
when the depth of the first concave portion is equal to the thickness of the color filter layer, a plurality of second concave portions corresponding to the plurality of the first concave portions in the color filter layer are disposed in the second insulating layer, each second concave portion and its corresponding first concave portion are communicated, and the touch electrode further covers surfaces of the plurality of the second concave portions.

8. The color filter substrate according to claim 7, wherein a depth of the second concave portion is smaller than or equal to a thickness of the second insulating layer.

9. The color filter substrate according to claim 8, wherein when the depth of the second concave portion is equal to the thickness of the second insulating layer, the touch electrode is made of an opaque metal material.

10. The color filter substrate according to claim 1, further comprising: a third insulating layer covering the touch electrode.

11. The color filter substrate according to claim 10, further comprising: a spacer disposed on a side of the third insulating layer away from the base substrate.

12. A display device, comprising a color filter substrate, wherein the color filter substrate comprises:
a base substrate;
a color filter layer, disposed on the base substrate and comprising a plurality of sub-pixels; and
a touch electrode, disposed on a side of the color filter layer away from the base substrate,
wherein a plurality of first concave portions are disposed in the color filter layer on the side away from the base substrate, and the touch electrode covers surfaces of the plurality of the first concave portions.

13. The display device according to claim 12, wherein the color filter substrate further comprises:
a first insulating layer, disposed on the side of the color filter layer away from the base substrate, wherein
a plurality of openings corresponding to the plurality of the first concave portions in the color filter layer are disposed in the first insulating layer, each opening and its corresponding first concave portion are communicated, and the touch electrode is formed on the first insulating layer and further covers surfaces of the plurality of the openings.

14. The display device according to claim 13, wherein the color filter substrate further comprises:
a second insulating layer, disposed on a side of the color filter layer facing the base substrate.

15. The display device according to claim 14, wherein a depth of the first concave portion is smaller than or equal to a thickness of the color filter layer.

16. The display device according to claim 15, wherein
the second insulating layer comprises a black matrix;
when the depth of the first concave portion is smaller than the thickness of the color filter layer, the first concave portion is disposed in a region where the sub-pixels are located, and/or the first concave portion is disposed in a region where the black matrix is located; and
when the depth of the first concave portion is equal to the thickness of the color filter layer, the first concave portion is disposed in the region where the black matrix is located.

17. The display device according to claim 16, wherein
when the first concave portion is disposed in the region where the sub-pixels are located, the touch electrode is made of a transparent conducting material; and
when the first concave portion is disposed in the region where the black matrix is located, the touch electrode is made of the transparent conducting material or an opaque metal material.

18. The display device according to claim 15, wherein
when the depth of the first concave portion is equal to the thickness of the color filter layer, a plurality of second concave portions corresponding to the plurality of the first concave portions in the color filter layer are disposed in the second insulating layer, each second concave portion and its corresponding first concave portion are communicated, and the touch electrode further covers surfaces of the plurality of the second concave portions.

19. The display device according to claim 18, wherein a depth of the second concave portion is smaller than or equal to a thickness of the second insulating layer.

20. The display device according to claim 19, wherein when the depth of the second concave portion is equal to the thickness of the second insulating layer, the touch electrode is made of an opaque metal material.

* * * * *